United States Patent [19]

Robinson et al.

[11] Patent Number: 5,424,635
[45] Date of Patent: Jun. 13, 1995

[54] SHAFT SPEED SIGNAL INDICATOR

[75] Inventors: James W. Robinson, Alpha; James L. Hymes, Colona, both of Ill.

[73] Assignee: Case Corporation, Racine, Wis.

[21] Appl. No.: 978,247

[22] Filed: Nov. 18, 1992

[51] Int. Cl.$^6$ .................. G01P 3/484; G01P 3/487
[52] U.S. Cl. ........................... 324/168; 324/174
[58] Field of Search ............... 324/166–180, 324/207.11, 207.22–207.26, 207.13

[56] References Cited

U.S. PATENT DOCUMENTS

| | | | |
|---|---|---|---|
| 3,611,343 | 10/1971 | Schoenbach | 340/271 |
| 4,663,601 | 5/1987 | Troutman et al. | 324/207.13 X |
| 4,787,072 | 11/1988 | Joy | 324/168 X |
| 4,890,059 | 12/1989 | Guentner | 324/174 |
| 4,901,014 | 2/1990 | Riegger et al. | 324/166 |
| 5,010,290 | 4/1991 | Foster | 324/173 |
| 5,066,910 | 11/1991 | Sugiyama | 324/174 X |

Primary Examiner—Sandra L. O'Shea
Assistant Examiner—Warren S. Edmonds
Attorney, Agent, or Firm—Rudnick & Wolfe

[57] ABSTRACT

A shaft speed signal indicator including a hub, bearing, switch assembly and housing which are mounted as a compact and integral unit to a free end of a revoluble shaft. The signal indicator further includes electric circuitry connected to contacts of the switch assembly for signalling the rotational speed of the revoluble shaft relative to a predetermined revolution rate. The hub carries a plurality of magnets for rotation about a predetermined path and to cause the contacts of the switch assembly to operate at a rate proportional to the movement of the magnets therepast. The housing of the signal indicator maintains the contacts of the switch assembly at a predetermined distance from the magnets and includes an exterior configuration substantially encompassing the hub and shields the end of the revoluble shaft.

8 Claims, 2 Drawing Sheets

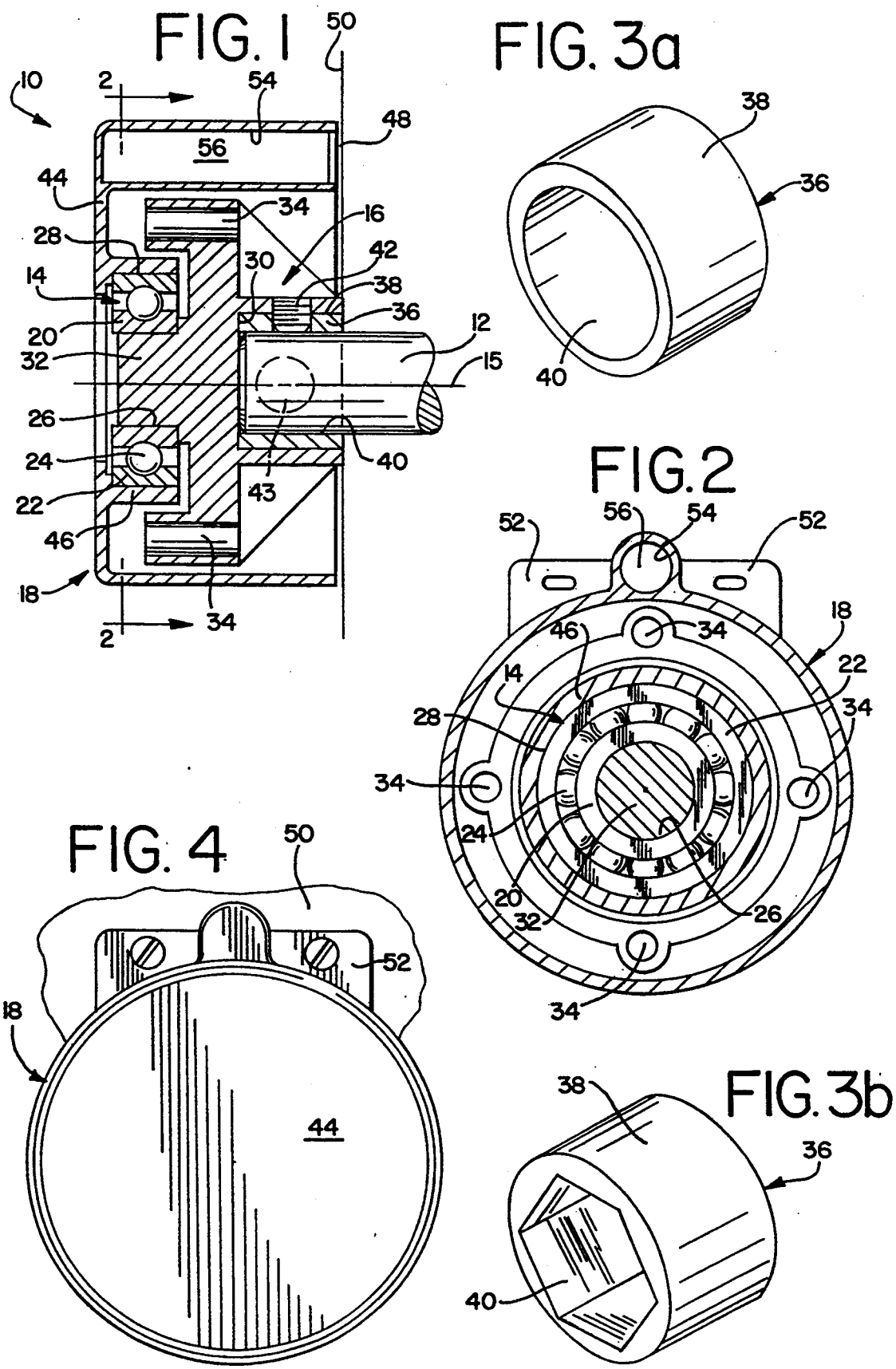

SHAFT SPEED SIGNAL INDICATOR

FIELD OF THE INVENTION

The present invention generally relates to a shaft speed signal indicator and, more particularly, to a signal indicator which is mounted as a compact integral unit to a free end of a shaft to sense the revoluble speed thereof while shielding the shaft end.

BACKGROUND OF THE INVENTION

Various shaft speed signal indicators have been heretofore proposed to develop voltages proportional to shaft speed. Such indicators are typically used to indicate failure of proper rotation or movement of a shaft or part of a machine such as a combine, for example, in which belt slippage or breakage or other malfunctions can cause considerable damage or loss of time if not immediately detected. Heretofore known shaft speed indicators have been comprised of a magnet secured to a collar adapted to rotate with a shaft and a reed switch which is responsive to the magnet moving therepast.

While such indicators were acceptable, there were numerous problems associated therewith. One of the problems involved with these heretofore known indicators involved setting a proper air gap between the reed switch and the magnets on the shaft. As will be appreciated, misadjustment of the air gap often resulted in damage to the component parts and/or inaccurate signals being developed by the sensor. The numerous parts comprising these known sensors also proved costly and burdensome in assembly.

Additional screws and related hardware were required for mounting the reed switch and magnets in their proper relation relative to each other. Moreover, the known sensors required a separate shield to guard or protect the free end of the shaft and the sensor against inadvertent damage. Such a shield required separate hardware for attaching the shield to a wall of the machine. Damage to the parts and the relatively delicate air gap adjustment for the indicator proves to be a continual problem when such speed indicators are used on agricultural equipment movable through a field and, thus, is subject to continual impact with corn stalks and other obstacles.

Thus, there is a need and a desire for a shaft speed signal indicator which mounts as a compact integral assembly to a shaft with a predetermined and proper air gap adjustment being maintained between the component parts and which shields the free end of the shaft.

SUMMARY OF THE INVENTION

In view of the above, and in accordance with the present invention, there is provided a shaft speed signal indicator for producing output signals indicative of the revolution rate of a shaft. The signal indicator comprises a hub configured on one side to be accurately fitted around the free end of the revoluble shaft to prevent perceptible movement therebetween and configured on an opposite side to accurately locate and prevent perceptible movement of a bearing relative thereto. The hub further includes a plurality of magnets equally spaced thereabout to move along a predetermined path of movement upon rotation of the hub. A housing is concentrically secured to the bearing to prevent perceptible movement therebetween. The housing defines a cavity for accommodating a switch assembly including a pair of contacts periodically operable between an interengaged condition and a disengaged condition at a rate proportional to the movement of the magnets therepast. The housing further includes an exterior configuration which substantially encompasses the hub and shields the free end of the shaft. The sensor assembly further includes electronic circuitry connected to the switch assembly. The electronic circuitry develops outputs which signal the rotational speed of the hub and thereby said shaft relative to a predetermined revolution rate.

In a preferred form of the invention, the electronic circuitry comprises charging means for fixing the charge of a capacitor at a first level in response to operation of the switch assembly contacts to one of the conditions and with the charge of the capacitor being changed at a uniform rate toward a second or different level during operation of the switch assembly contacts in the other condition. The charging means are preferably connected in parallel relation to the capacitor and wherein the capacitor is charged from a voltage source through a resistor. The output signals of the sensor assembly are derived by measuring means responsive to the difference between the first and second levels.

The electronic circuitry further includes a control device preferably in the form of a transistor having a base electrode or controller for controlling current flow during each operation of the contacts to one of the conditions. Electronic circuitry interconnects the control device and the contacts of the switch assembly for rendering the control device conductive for a short time interval in response to operation of the contacts to one of the conditions. Thus, the duration of contact operation is not critical whereas each operation of the contacts will result in only one operation of the charging means so as to obtain a more sensitive and accurate measurement.

In a preferred form of the invention, the measuring means includes a second capacitor coupled through a unidirectional conductive device for charging the second capacitor to the second or peak level. The measuring means further includes a voltage comparator circuit for comparing the output of the first capacitor with a reference voltage. A trigger circuit is switched from one condition to a second condition upon application of a certain voltage thereto. The voltage is proportional to the output of the difference between the first and second levels.

An advantage of the present invention concerns the versatility of the speed signal indicator of the present invention. In a preferred form of the invention, the hub includes interchangeable sleeves which are adapted to be fixedly accommodated and held on one side of the hub. Each of the sleeves have a common outside diameter with different inside configurations and/or to accommodate shafts of different configurations and/or sizes.

A further advantage of the present invention is that the hub, housing, bearing, and switch assembly are maintained as an integral unit. Thus, a predetermined and proper air gap is set and maintained between the magnets and the contacts of the reed switch thus facilitating proper signal generation and eliminating tenuous adjustments between component parts of the assembly. The compact and integral unit saves time in assembling the speed sensor to the shaft. Moreover, the exterior of the housing shields the free end of the shaft.

Numerous other features and advantages of the present invention will become readily apparent from the following detailed description, the accompanying drawings, and the appended claims.

BRIEF DESCRIPTION OF THE DRAWINGS

FIG. 1 is a longitudinal sectional view of the shaft speed signal indicator of the present invention;

FIG. 2 is a sectional view taken along line 2—2 of FIG. 1;

FIGS. 3a and 3b schematically represent interchangeable sleeves which are adapted for use with the present invention;

FIG. 4 is an end elevational view of the shaft speed signal indicator of the present invention.

DESCRIPTION OF THE PRESENT INVENTION

Figure 5:
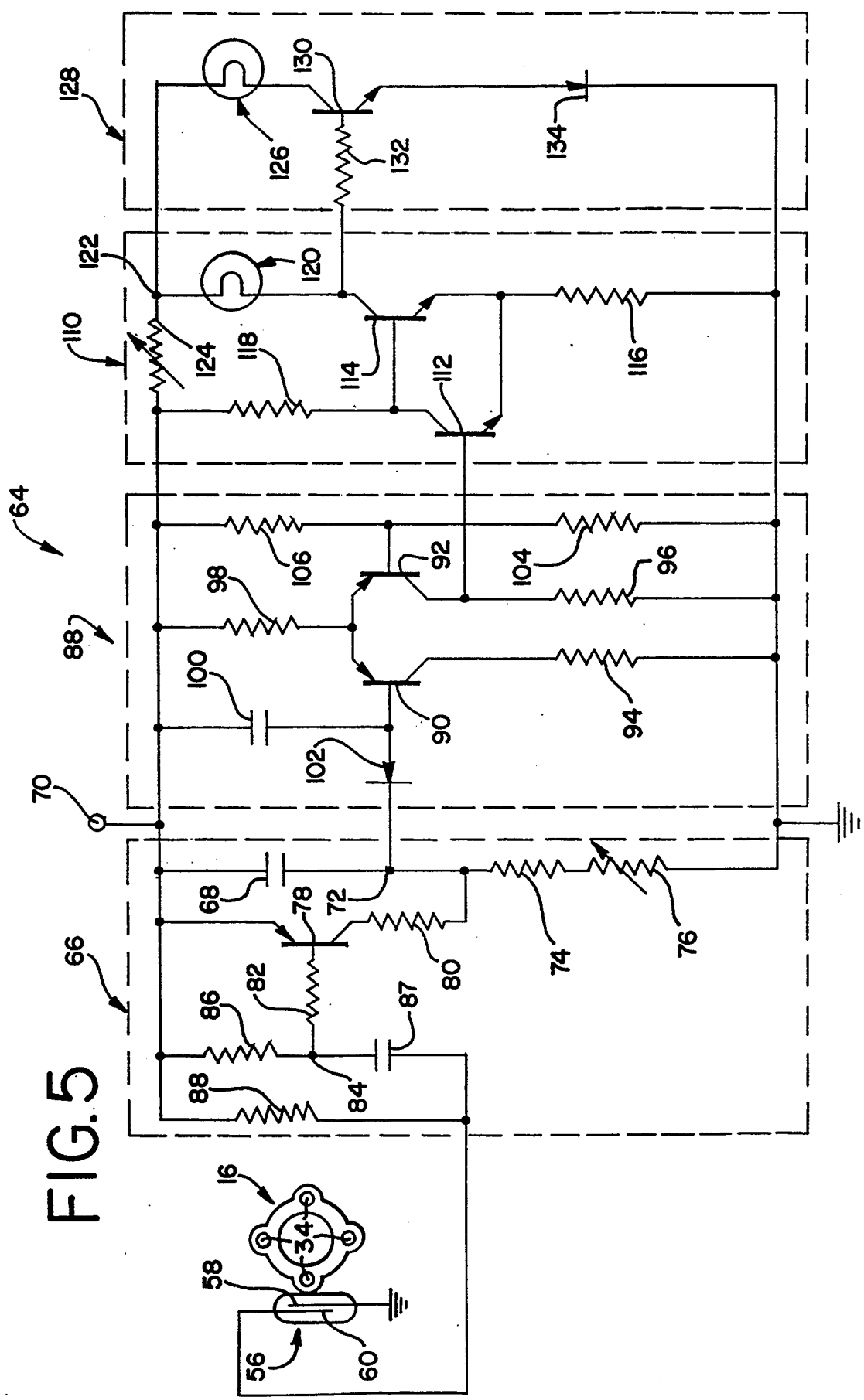
FIG. 5 is a schematic diagram of one preferred form of electronic circuitry associated with the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, there is schematically illustrated a speed signal indicator 10 which is accurately fitted around a free end of a revoluble shaft 12 which may, for example, be a shaft of a combine. In the operation of combines and like agricultural equipment, the rotation of certain shafts may stop or may continue at a reduced speed, due to belt breakage or slipping and if such malfunctions are not quickly detected, continued operation of the machine may result in considerable damage thereto.

The speed signal indicator 10 includes a bearing 14, a hub 16, and a housing 18. A salient feature of the present invention is that bearing 14, hub 16, and housing 18 are interconnected as an integral and compact unit to facilitate connecting the signal indicator 10 to a free end of the shaft 12 with minimal time and involvement.

Bearing 14 is an anti-friction bearing of conventional design which defines an axis of rotation 15 for the hub 16. More specifically, bearing 14 includes an annular inner race 20, an outer race 22, and a series of anti-friction elements or spheres 24 for facilitating free rotation of the races 20, 22 relative to each other. The inner race 20 defines a bore 26 having an inside diameter which is toleranced within a few thousandths of an inch. Likewise, outer race 22 defines an outer annular surface 28 having an outside diameter which is toleranced within a few thousandths of an inch.

In the embodiment illustrated, hub 16 has a two-sided preferably molded configuration. On one side, hub 16 is configured with a blind central cavity 30 which fixedly accommodates a free end of shaft 12 therewithin. On an opposite side, hub 16 is configured with a central stub shaft 32 arranged in axial alignment with cavity 30. As shown, the outside diameter of stub shaft 32 is journalled within bore 26 of the bearing inner race 20.

The outside diameter of stub shaft 32 is sized to prevent perceptible movement of bearing race 20 relative thereto. In a most preferred form of the invention, the outside diameter stub shaft 32 is sized to establish an interference fit with the bore 26 of bearing race 20. The interference fit between stub shaft 32 and race 20 is established for accurate location and alignment of the respective parts and such that the smallest toleranced diameter of stub shaft 32 is always greater than the largest toleranced diameter of bore 26 of race 20 with no specific requirements for bore pressures.

As shown in FIG. 2, hub 16 further includes a plurality of equally spaced magnets 34 secured for rotation therewith. In the illustrated embodiment, hub 16 includes four magnets equally spaced about the circumference of the hub 16.

In a most preferred form of the invention, hub 16 further includes interchangeable sleeves 36 (FIGS. 3a and 3b) adapted to accommodate and be fixedly held within cavity 30 of hub 16. Each sleeve is preferably fabricated from a suitable metal material and has a cylindrical outer surface 38 which is toleranced to establish a close-sliding fit with cavity 30 of hub 16. The "close-sliding fit" of each sleeve 36 within cavity 30 is intended for accurate location of the sleeve within cavity 30 without perceptible movement therebetween.

To facilitate interchangability between the sleeves and thereby enhance the versatility of the present invention, the outside diameter of each sleeve 36 is substantially identical. As shown in FIGS. 3a and 3b, each sleeve 36 defines an inner bore or opening 40. The particular cross section of the bore or opening 40 in a sleeve 36 corresponds to a particular shaft over which the sleeve 36 and hub 16 fit. As shown, a releasable fastener 42 threadably engages the hub 16 and sleeve 36 to releasably fix the sensor assembly 10 to the free end of shaft 12.

In the illustrated embodiment, housing 18 has a cup-like configuration with hub 16 extending into a hollow interior thereof. An opening 43 in a sidewall of housing 18 permits access to the fastener 42 used to secure the signal indicator 10 to the shaft 12. A generally planar back wall 44 of housing 18 includes a mounting flange 46 which extends toward the interior of and for securing the housing 18 to the outer race 22 of bearing 14.

In the embodiment illustrated in FIGS. 1 and 2, mounting flange 46 has an annular configuration with an inside diameter of the flange 46 being sized to prevent perceptible movement of bearing race 22 relative thereto. In the most preferred form of the invention, the inside diameter of flange 46 is sized to establish a press fit relative to the outside race 22 of bearing 14. The "press fit" between mounting flange 46 and the outer race 22 of bearing 14 ensures accurate location and alignment of the respective parts and wherein the parts are highly stressed.

Housing 18 is further provided with an exterior configuration which substantially encompasses the hub 16 so as to shield the free end of the shaft 12. Notably, when housing 18 is fitted onto bearing 14, an inner face 48 of the housing 18 is arranged proximate to an outer wall or face 50 of the implement to which the sensor assembly is mounted. As shown in FIGS. 2 and 4, housing 18 may further be provided with exterior mounting flanges 52 which facilitate securement of the signal indicator 10 to the outer face or wall 50 of the implement.

Returning to FIG. 1, housing 18 further defines a cavity 54 arranged a predetermined distance from the axis of rotation 15 of the hub 16. A proximity sensor 56 is fixedly mounted in cavity 54. Proximity sensor is preferably in the form of a conventional reed switch assembly of the type sold by Hamlin of Lake Mills, Wis. and sold under Model No. 59025-010.

Suffice it to say, and as shown in FIG. 5, the switch 56 is a sealed-switch assembly and includes a pair of contacts 58 and 60 encapsulated in a glass tube to ensure a clean working environment unaffected by outside contaminants or conditions. The contacts 58 and 60 preferably include two ferromagnetic reeds placed in a cantilever style so ends align and overlap, but with a small air gap therebetween. When brought into the influence of a magnetic field, extreme ends of the overlapping reeds or contacts assume opposite magnetic polarity. When the magnetic flux density is sufficiently strong, attraction forces of the opposing magnetic poles overcome reed stiffness and cause them to flux toward each other making contact. Because there are no mechanical parts, there is no sticking or binding to wear out.

In the illustrated embodiment there are four magnets 34 associated with the hub 16. Thus, switch assembly 56 operates four times during each complete cycle rotation of shaft 12. As will be appreciated, a different number of equally spaced magnets than that shown could be utilized without detracting from the spirit and scope of the present invention.

The signal indicator of the present invention further includes electronic circuitry 64 connected and responsive to the switch assembly 56. As shown in FIG. 5, contact 58 of switch assembly 56 is connected to ground while contact 60 is connected to a ramp generator generally designated by reference numeral 66. The ramp generator 66 comprises a capacitor 68, one terminal of which is connected to a power supply terminal 70 which may be connected to the positive terminal of a DC source such as a battery on the combine. The negative terminal of the voltage source is connected to ground. The other terminal of the capacitor 68 is connected to a circuit point 72 which is connected through a fixed resistor 74 and an adjustable resistor 76 to ground. In the absence of other circuitry, the capacitor 68 would be charged exponentially upon application of the supply voltage at a rate determined by the capacitance of the capacitor 68 and the resistance of the resistors 74 and 76. The capacitor 68 is, however, periodically discharged in response to operation of the sensor switch 56. In particular, a transistor 78 is provided having an emitter connected to the power supply terminal 70 and having a connector connected through a resistor 80 to the circuit point 72. The base of the transistor 78 is connected through a resistor 82 to a circuit point 84 which is connected through a resistor 86 to the power supply terminal 70 and through a capacitor 87 to the contact 60, a resistor 88 being connected between contact 60 and power supply terminal 70.

In operation, when the contacts 58 and 60 are interengaged, current flows from the power supply terminal 70 through the emitter-based junction of transistor 78, through resistor 82, capacitor 87, and the switch assembly 56 to ground. The transistor 78 then conducts heavily, causing discharge of the capacitor 68 through the emitter-collector path of the transistor 78 and the current limiting resistor 80. This operation continues only for a very short time interval, the capacitor 87 being rapidly charged and even though the switch 56 remains closed for a substantial time interval, the conduction of transistor 78 is limited to a comparatively short time interval. After the switch 56 opens, however, the capacitor 87 may discharge through the resistors 80 and 82 to be nearly completely discharged at the next closure of the contacts 58 and 60.

With rotation of shaft 12 at a constant speed, the level to which the potential of the circuit point 72 drops, just before each closure of switch 56, is dependent upon the speed of rotation. With a high speed of rotation, the potential level is relatively high while with very slow rotation of shaft 12, the potential level can drop to a value close to ground potential. The potential level is thus an indication of the speed of rotation of shaft 12.

The output of the ramp generator 66, developed at the circuit point 72, is applied to a voltage comparator circuit generally designated by reference numeral 88. Circuit 88 comprises a pair of transistors 90 and 92. Each transistor 90, 92 has a collector connected through resistors 94, 96 respectively, to ground. The emitters of transistors 90, 92 are connected together and, through a resistor 98, are connected to the power supply terminal 70. The base of the transistor 90 is connected through a capacitor 100 to the power supply terminal 70 and through a diode 102 to the circuit point 72. The base of the transistor 92 is connected through a resistor 104 to ground and through a resistor 106 to the power supply terminal 70.

In operation of the voltage comparator circuit 88, the capacitor 100 is charged in accordance with the peak charge developed across the capacitor 68 of the ramp generator 66. Thus, the potential of the base of transistor 90 rises or falls in accordance with increases or decreases in the speed of rotation of shaft 12. The capacitor 100 in combination with diode 102 forms a storage or integrating circuit to prevent rapid fluctuations in the potential of the base of the transistor 90 and to stabilize the operation of the sensor assembly.

The transistors 90 and 92 operate to compare the output voltage derived from the ramp generator 66, developed across the capacitor 100, with a reference voltage applied to the base of the transistor 92, which is a certain fraction, preferably one-half of the supply voltage. The operation is such that the output of the voltage comparator circuit 88, developed at the collector of the transistor 92, is not effected by supply voltage variations within normal limits.

The output of the voltage comparator circuit 88 developed at the collector of the resistor 92, is applied to a Schmitt trigger circuit generally designated by reference numeral 110. In the illustrated embodiment, trigger circuit 110 includes two transistors 112 and 114. The emitters of the transistors 112 and 114 are connected together and through a resistor 116 to ground. The collector of the transistor 112 is connected to the base of the transistor 114 and through a resistor 118 to the power supply terminal 70. The base of the transistor 112 is connected directly to the collector of the transistor 92. The collector of the transistor 114 is connected through a lamp 120 to a circuit point 122 which is connected through a variable resistor 124 to the power supply terminal 70.

In operation, when the speed of rotation of the shaft 12 drops below a certain set speed, the circuit 110 triggers in one direction to cause the transistor 114 to conduct heavily and to energize the lamp 120. Lamp 120 thus indicates when the speed of shaft 12 is below a predetermined speed. When the speed of shaft 12 is increased above a predetermined or set speed, the circuit 110 triggers in the opposite direction to cut off conduction through the transistor 114 and to de-energize the lamp 120.

To positively indicate that the speed of shaft 12 is above a predetermined level, a lamp 126 forming part of an inverter circuit 128 is illuminated. Inverter circuit 128 comprises a transistor 130 having a base electrode connected through a resistor 132 to the collector of the transistor 114 of trigger circuit 110. An emitter of transistor 130 is connected through a diode 134 to ground. A collector of transistor 130 is connected through lamp 126 to the circuit point 122. When the speed of shaft 12 is above the set or predetermined speed and the transistor 114 is nonconducting, a relatively high potential is applied through the resistor 132 to the base of the transistor 130 thereby causing transistor 130 to conduct and to energize the lamp 126. Thus, the lamp 126 indicates when the speed of shaft 12 is above a set speed while lamp 120 indicates when the speed of shaft 12 is below a set speed. The intensity of the lamps 120 and 126 may be controlled by adjustment of the variable resistor 124.

A predetermined or set speed of shaft 12 may change depending on particular operations and other variables for the machine. Accordingly, the circuitry 64 can be adjusted to adjust when lamps 120 and 126 provide an indication of the operational speed of shaft 12. In the preferred embodiment, the set speed may be modulated through adjustment of the resistor 76 in the charging circuit for the capacitor 68 of the ramp generator 66.

Instead of or in addition to the lamps 120 and 126, other signal devices such as audible signal devices may be used to indicate when the speed of shaft 12 is above or below a predetermined set speed. Alternatively, circuitry 64 can also be used to apply a control signal to a regulating system such as, for example, a system operative to control the driving speed of shaft 12. Another feature of the present invention is that the output of the ramp generator 66 or the output of the voltage comparator 88 may be applied to a meter or other indicating device to directly indicate shaft speed or may be applied to a control system for regulating operation of shaft 12.

The interference fit between stub shaft 32 of hub 16 and bearing 14 ensures a predetermined path of rotation for the magnets relative to the switch assembly 56 thereby enhancing the operating performance of the sensor assembly. Moreover, the press fit between mounting flange 52 of housing 18 and the bearing 14 ensures a predetermined air gap between the magnets 34 and the contacts 58 and 60 of switch assembly 56. Thus, the tenuous and time consuming task of adjusting and readjusting the air gap between the magnets and sensor has been eliminated. Additionally, the above referenced fits between its component parts allows the shaft speed signal indicator 10 to be fit over the shaft 12 as an integral unit rather than a compilation of loose parts thereby reducing part inventories and significantly reducing the time required to assemble the sensor to the machine with which it is adapted for use. Furthermore, the exterior configuration of housing 18 shields the free end of shaft 12.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A shaft speed signal indicator for producing output signals indicative of the revolution rate of a revoluble shaft, said signal indicator comprising:

a hub defining a blind bore on one side thereof and a central stub shaft extending from an opposite side thereof, said bore and stub shaft being arranged in axial alignment relative to each other and concentric relative to a rotational axis of said revoluble shaft, said bore being sized to accurately fit around a free end of the revoluble shaft to prevent perceptible movement therebetween when said hub is secured to said revoluble shaft, said stub shaft having a bearing assembly accurately mounted thereon to prevent perceptible movement of said bearing assembly relative and wherein said hub further includes a plurality of magnets equally spaced thereabout to move along a predetermined path of movement upon rotation of the hub;

a housing defining a cavity radially spaced from the rotational axis of said revoluble shaft a predetermined distance for accommodating a switch assembly including a pair of contacts periodically operable between an interengaged condition and a disengaged condition at a rate proportional to the movement of the magnets therepast, said housing being concentrically secured to the bearing assembly so as to prevent perceptible movement therebetween thereby improving the sensing ability of the switch assembly by maintaining a predetermined clearance between the magnets and said contacts while facilitating assembly of said signal indicator to said revoluble shaft by maintaining the hub, housing, bearing assembly and switch assembly as an integral unit, said housing further including an exterior configuration substantially encompassing said hub and shielding the free end of the revoluble shaft; and electronic circuitry connected to the contacts of the switch assembly, said circuitry including electronics operative during each operation of said contacts to one of said conditions for signalling the rotational speed of said hub and thereby said revoluble shaft relative to a predetermined revolution rate.

2. The shaft speed signal indicator to claim 1 wherein said electronics for signalling the rotational speed of the revoluble shaft comprises capacitance means, charging means including a control device having a controller coupled to said capacitance means to operate when conductive to fix the charge of said capacitance means at a first level, charge changing means for changing the charge of said capacitance means toward a second level at a predetermined rate when said control device is nonconductive, circuitry means interconnecting said contacts and said controller to apply a signal to said controller to render said control device conductive during each operation of said contacts to one of said conditions and to fix the charge of said capacitance means at said first level; said control device and said circuitry means being constructed and arranged to render said control device highly conductive during only a short duration time interval at the initial portion of each operation of said contacts to one of said conditions to rapidly fix the charge of said capacitance means at said first level, and measuring means for deriving said output signals in response to the difference between said levels.

3. The shaft speed signal indicator according to claim 2 wherein said control device is a transistor having a base electrode as said controller, and said circuitry means includes second capacitance means arranged in series relation between said switch assembly and said base electrode so as to rapidly charge during the short duration time interval to produce a high base current and thereby a high current conduction of said transistor during said short duration time interval.

4. The shaft speed signal indicator to claim 2 wherein said measuring means comprises second capacitance means, and unidirectional means connected in series with and to charge said second capacitance means to said second level.

5. The shaft speed signal indicator according to claim 2 wherein said measuring means comprises a voltage comparator circuit having at least two inputs, reference voltage means connected to one of said inputs, and means for applying to the other of said inputs a voltage proportional to the difference between said first and second levels.

6. The shaft speed signal indicator according to claim 2 wherein said measuring means comprises a trigger circuit comprising a voltage comparator circuit having two inputs, reference voltage means for applying a reference voltage to the other of said inputs a voltage proportional to the difference between said first and second levels.

7. The shaft speed signal indicator according to claim 1 wherein said hub includes interchangeable sleeves adapted to be fixedly accommodated and held in the blind bore defined in said hub, each of said sleeves having a common outside diameter with different bores to accommodate revoluble shafts of different configurations and sizes.

8. A shaft speed signal indicator for producing output signals indicative of the revolution rate of a revoluble shaft, said signal indicator comprising:

an anti-friction bearing assembly including an inner race, an outer race, with a series of elements therebetween for facilitating free rotational and concentric movement of said races relative to each other;

a hub defining a blind bore on one side thereof for accurately fitting about and to be secured to a free end of the revoluble shaft and configured on an opposite side with a stub shaft that is arranged in axial alignment relative to said bore and concentrically relative to the rotational axis of said revoluble shaft, said stub shaft having an outside diameter which is journalled by and sized to establish an interference fit with the inner race of the beating assembly, said hub further including a plurality of magnets equally and circumferentially spaced thereabout, and wherein the accurate fit of said hub on said revoluble shaft and the interference fit of said hub within the bearing assembly defines a predetermined path of movement of the magnets upon rotation of said hub;

a housing secured as by a press fit to the outer race of the beating assembly, said housing including an exterior configuration substantially encompassing said hub to shield the free end of the revoluble shaft, the exterior of said housing defining a peripheral cavity disposed a predetermined distance from the rotational axis of said revoluble shaft for receiving and holding a reed switch assembly in specified relation to the predetermined path of movement of said magnets, said reed switch assembly including a pair of contacts periodically operable between an interengaged condition and a disengaged condition at a rate proportional to the movement of the magnets therepast, and wherein the press fit of said housing about the bearing maintains the housing, hub, bearing assembly and reed switch assembly as an integral unit thereby facilitating assembly of the signal indicator to the revoluble shaft; and electronic circuitry connectable to a suitable source of energy and to the contacts of the reed switch assembly, said circuitry including electronics operative during each operation of said contacts to one of said conditions for signalling the relative rotational speed between the hub and a predetermined revolution rate of said shaft.

* * * * *